United States Patent
Ebara et al.

(10) Patent No.: US 6,835,791 B2
(45) Date of Patent: Dec. 28, 2004

(54) STRETCHED POLYPROPYLENE FILM

(75) Inventors: Takeshi Ebara, Chiba (JP); Kazuki Wakamatsu, Sodegaura (JP)

(73) Assignee: Sumitomo Chemical Company, Limited, Osaka (JP)

( * ) Notice: Subject to any disclaimer, the term of this patent is extended or adjusted under 35 U.S.C. 154(b) by 0 days.

(21) Appl. No.: 10/314,132

(22) Filed: Dec. 9, 2002

(65) Prior Publication Data

US 2003/0144448 A1 Jul. 31, 2003

(30) Foreign Application Priority Data

Dec. 12, 2001 (JP) ....................................... 2001-378217

(51) Int. Cl.⁷ .............................................. C08F 210/06
(52) U.S. Cl. ...................... 526/348.1; 526/65; 526/348; 526/351; 525/53; 525/240
(58) Field of Search ............................... 526/65, 348.1; 525/53, 240

(56) References Cited

U.S. PATENT DOCUMENTS 4,675,247 A    6/1987  Kitamura et al.
4,981,760 A  * 1/1991  Naito et al. .................. 428/523
2003/0204017 A1 * 10/2003 Stevens et al. ............... 525/53

FOREIGN PATENT DOCUMENTS

| JP | 62-119212 A | 5/1987 |
| JP | 7-227945 A | 8/1995 |
| JP | 8-283343 A | 10/1996 |

* cited by examiner

Primary Examiner—Roberto Rabago
(74) Attorney, Agent, or Firm—Sughrue Mion, PLLC

(57) ABSTRACT

Disclosed is a stretched film excellent in low-temperature heat sealability after corona treatment as well as that before corona treatment and/or in heat shrinkability, the stretched film being comprised of a layer comprising a copolymer of propylene with α-olefin and/or ethylene such that in measurement of a DSC curve the amount of the heat absorbed in the temperature range of from T−10 (° C.) to T+10 (° C.) accounts for from 15 to 36% of the amount of the heat absorbed in the temperature range of from 53 to 170° C., wherein T denotes a temperature (° C.) at which a maximum endothermic peak appears in the DSC curve.

4 Claims, No Drawings

STRETCHED POLYPROPYLENE FILM

BACKGROUND OF THE INVENTION

1. Field of the Invention

The present invention relates to a stretched film excellent in low-temperature heat sealability after corona treatment as well as that before corona treatment, and/or in heat shrinkability.

2. Description of the Related Art

Polypropylene has been used widely in fields of films and sheets due to its excellent transparency, heat resistance and food sanitation. In particular, a material with low-temperature heat sealability is awaited in such fileds as food packaging.

For example, JP,2-57770,B discloses, as a material with low-temperature heat sealability, a laminated polypropylene film having an excellent low-temperature heat sealability, an excellent transparency, a low blocking and a good scratch resistance, in which a copolymer which is obtained by a specific polymerization method using a specific catalyst system, the copolymer containing a specific amount of a specific comonomer as a main component as a copolymerization component and containing a specific cold xylene-soluble portion and a specific boiling heptane-insoluble portion, is laminated as a heat sealable layer.

Publication of Japanese Patent No. 3070419 discloses a laminated polypropylene film having an excellent low-temperature heat sealability and an excellent hot tack property without losing a good transparency and a good blocking resistance, in which a random copolymer of propylene with an α-olefin having 4 or more carbon atoms is laminated as a heat sealing resin, the random copolymer being obtained by use of a specific catalyst system and a specific polymerization method and having a specific comonomer composition, a specific molecular weight distribution, a specific cold xylene-soluble portion and a specific composition of cold xylene soluble portion.

However, in such fields as food packaging, the speed of package fabrication has recently been enhanced and therefore materials moreexcellent in low-temperature heat sealability after corona treatment as well as that before corona treatment have been awaited.

SUMMARY OF THE INVENTION

The object of the present invention is to provide a stretched film excellent in low-temperature heat sealability after corona treatment as well as that before corona treatment, and/or in heat shrinkability.

In view of the above-mentioned actual situations, the present inventors found, through their diligent investigation, that the above problem can be solved by a film stretched at least uniaxially, the film comprising a layer comprising a copolymer of propylene with α-olefin and/or ethylene such that in measurement of a DSC curve the amount of the heat absorbed in the temperature range of from T−10 (° C.) to T+10 (° C.) accounts for from 15 to 36% of the amount of the heat absorbed in the temperature range of from 53 to 170° C., wherein T denotes a temperature (° C.) at which a maximum endothermic peak appears in the DSC curve.

In the present invention, the amount of the heat absorbed in the temperature range of from T−10 (° C.) to T+10 (° C.) is referred to as "the amount of the main heat absorbed", and the amount of the heat absorbed in the temperature range of from 53 to 170° C. is referred to as "the amount of the total heat absorbed."

DESCRIPTION OF PREFERRED EMBODIMENTS

The copolymer of propylene with α-olefin and/or ethylene used in the present invention is a copolymer of propylene with α-olefin and/or ethylene such that in measurement of a DSC curve the amount of the heat absorbed in the temperature range of from T−10 (° C.) to T+10 (° C.) (namely, the amount of the main heat absorbed) accounts for from 15 to 36% of the amount of the heat absorbed in the temperature range of from 53 to 170° C. (namely, the amount of the total heat absorbed), wherein T denotes a temperature (° C.) at which a maximum endothermic peak appears in the DSC curve.

Samples used in the measurement of a DSC curve are specifically 0.5 mm thick sheets obtained by hot-press molding of the aforementioned copolymer of propylene with an α-olefin and/orethylene (specifically, preheating at 230° C. for 5 minutes, followed by increasing pressure to 50 kgf/cm$^2$G in 3 minutes, followed by maintaining the pressure, followed by cooling at 30° C. at 30 kgf/cm$^2$G for 5 minutes).

In the present invention, the measurement of a DSC curve is carried out under the following conditions. A DSC curve is obtained in such a manner that using a differential scanning calorimeter (Model DSC-7 manufactured by Perkin-Elmer, Inc.), about 10 mg of a specimen sampled from the above-mentioned sheet is heated at 220° C. for 5 minutes under a nitrogen atmosphere, followed by cooling to 150° C. at a temperature decrease speed of 300° C./minute, followed by holding at 150° C. for one minute, followed by cooling to 50° C. at a temperature decrease speed of 5° C./minute, followed by holding at 50° C. for one minute, and followed by heating from 50° C. to 180° C. at a temperature increase speed of 5° C./minute.

Calculated is the area of a region surrounded by the DSC curve and a straight line (baseline) obtained by joining the point at 53° C. on the DSC curve and that at 170° C., which area is called a first area. On the other hand, calculated is the area of a region surrounded by the baseline and the DSC curve within the temperature range of from T−10 (° C.) to T+10 (° C.) wherein T denotes a temperature (° C.) at which a maximum endothermic peak appears in the DSC curve, which area is called a second area. The ratio of the second area to the first area is equal to the ratio of the amount of the main heat absorbed to the amount of the total heat absorbed in the measurement of the DSC curve.

The stretched film of the present invention is characterized by having a layer comprising a copolymer of propylene with α-olefin and/or ethylene such that the thus calculated ratio of the amount of the main heat absorbed to the amount of the total heat absorbed is from 15 to 36%.

The ratio of the amount of the main heat absorbed to the amount of the total heat absorbed is preferably from 18 to 35%, and more preferably from 20 to 34%.

If the ratio exceeds 36%, the distribution of the melting point of a polypropylene becomes narrow to cause stickiness of a film in a temperature range for film formation from the copolymer. This may result in deterioration of operation efficiency or deterioration of corona treatment resistance of a film.

On the other hand, if the ratio is less than 15%, the crystallization speed at the time of film formation will become small and the operation efficiency of film formation may be deteriorated. Moreover, the amount of low melting components is reduced and the heat shrinkability of stretched films may be deteriorated.

The melt flow rate (MFR) of the copolymer of propylene with α-olefin and/or ethylene used in the present invention, measured at 230° C., is preferably from 0.1 to 50 g/10 min, more preferably from 1 to 20 g/10 min from the viewpoint of flowability or film formability.

The copolymer of propylene with α-olefin and/or ethylene used in the present invention is not particularly restricted as long as it has the above-mentioned relationship. However, it is preferably a copolymer containing from 1 to 30% by weight of Component A defined below and from 70 to 99% by weight of Component B defined below, provided that the total amount of the copolymer of propylene with α-olefin and/or ethylene is let be 100% by weight.

Component A: A copolymer portion of propylene with α-olefin having 4 or more-carbon atoms or of propylene, α-olefin having 4 or more carbon atoms and ethylene satisfying (Requirement 1) and (Requirement 2) shown below.

(Requirement 1) The content of α-olefin having 4 or more carbon atom in Component A is not less than 1 mol % and less than 15 mol %.

(Requirement 2) The content of ethylene in Component A is not more than 5 mol %.

Component B: A copolymer portion of propylene with α-olefin having 4 or more carbon atoms or of propylene, α-olefin having 4 or more carbon atoms and ethylene satisfying (Requirement 3) and (Requirement 4) shown below.

(Requirement 3) The content of α-olefin having 4 or more carbon atoms in Component B is from 15 to 30 mol %.

(Requirement 4) The content of ethylene in Component B is not more than 5 mol %.

If the copolymer of propylene with α-olefin and/or ethylene used in the present invention is a copolymer containing the aforementioned Component A and Component B, the content of Component A is usually from 1 to 30% by weight, preferably from 5 to 30% by weight, and more preferably from 5 to 20% by weight. The content of Component B is usually from 70 to 99% by weight, preferably from 70 to 95% by weight, and more preferably from 80 to 95% by weight. The content of Component A is usually within the aforementioned range of from 1 to 30% by weight (in other words, the content of Component B is from 70 to 99% by weight) from the viewpoints of properties of a powder during polymerization, productivity of a polymer, heat sealability and heat shrinkability of a film.

The content of the α-olefin having 4 or more carbon atoms in Component A is usually not less than 1 mol % and less than 15 mol %, preferably not less than 5 mol % and less than 15 mol %, and more preferably from 5 to 10 mol %. The content of the α-olefin having 4 or more carbon atoms in Component A is within the aforementioned range of not less than 1 mol % and less than 15 mol % from the viewpoint of stickiness at the time of film formation.

The content of ethylene in Component A is usually not more than 5 mol %, and preferably not more than 3 mol %. The content of ethylene in Component A is usually in the aforementioned range of not more than 5 mol % from the viewpoints of whitening of a film with time and sticking at the time of film formation.

The content of the α-olefin having 4 or more carbon atoms in Component B is usually from 15 to 30 mol %, and preferably from 15 to 25 mol %. The content of α-olefin in Component B is usually in the aforementioned range of from 15 to 30 mol % from the viewpoints of heat sealability and heat shrinkability of a film, and stickiness at the time of film formation.

The content of ethylene in Component B is usually not more than 5 mol %, and preferably not more than 3 mol %. The content of ethylene in Component B is usually in the aforementioned range of not more than 5 mol % from the viewpoints of whitening of a film with time and stickiness at the time of film formation.

The α-olefin having 4 or more carbon atoms used in the present invention preferably includes α-olefins having from 4 to 20 carbon atoms, more preferably α-olefins having from 4 to 12 carbon atoms. Examples thereof include 1-butene, 2-methyl-1-propene, 1-pentene, 2-methyl-1-butene, 3-methyl-1-butene, 1-hexene, 2-ethyl-1-butene, 2,3-dimethyl-1-butene, 2-methyl-1-pentene, 3-methyl-1-pentene, 4-methyl-1-pentene, 3,3-dimethyl-1-butene, 1-heptene, methyl-1-hexene, dimethyl-1-pentene, ethyl-1-pentene, trimethyl-1-butene, methylethyl-1-butene, 1-octene, methyl-1-pentene, ethyl-1-hexene, dimethyl-1-hexene, propyl-1-heptene, methylethyl-1-heptene, trimethyl-1-pentene, propyl-1-pentene, diethyl-1-butene, 1-nonene, 1-decene, 1-undecene and 1-docedene. Preferred are 1-butene, 1-pentene, 1-hexene and 1-octene. More preferred are 1-butene and 1-hexene from the viewpoints of copolymerization property, economical efficiency, etc.

In the case where the copolymer of propylene with α-olefin and/or ethylene used in the present invention is a copolymer containing the aforementioned Component A and Component B, examples thereof include (propylene-1-butene)-(propylene-1-butene) copolymers, (propylene-1-butene)-(propylene-1-butene-ethylene) copolymers, (propylene-1-butene-ethylene)-(propylene-1-butene) copolymers, and (propylene-1-butene-ethylene)-(propylene-1-butene-ethylene) copolymers.

The method for producing the copolymer of propylene with α-olefin and/or ethylene used in the present invention is not particularly restricted. Production methods using known polymerization catalysts and known polymerization methods can be employed.

Examples of the polymerization catalyst include a Ti—Mg-based catalyst comprising a solid catalyst component having, as essential components, magnesium, titanium and halogen, a catalyst system having a combination of the aforementioned solid catalyst component, an organoaluminum compound and, as desired, a third component such as an electron-donating compound. Preferred is a catalyst system comprising a solid catalyst component having, as essential components, magnesium, titanium and halogen, an organoaluminum compound and an electron donating compound.

Examples of the solid catalyst component having, as essential components, magnesium, titanium and halogen include solid catalyst components described in JP,61-218606,A, JP,61-287904,A, JP,7-216017,A, etc.

Preferably employed as the organoaluminum compound are triethylaluminum, triisobutylaluminu, mixtures of triethylaluminum and diethylaluminum chloride, tetraethyldialumoxane, etc.

Preferably employed as the electron-donating compound are tert-butyl-n-propyldimethoxysilane, tert-butylethyldimethoxysilane, dicyclopentyldimethoxysilane, etc.

As a method for producing the copolymer of propylene with α-olefin and/or ethylene used in the present invention, mentioned are a method in which the copolymer of propylene with α-olefin and/or ethylene used in the present invention is produced by polymerizing propylene, α-olefin and/or ethylene using at least one polymerization reactor and a method in which the copolymer of propylene with α-olefin and/or ethylene used in the present invention is produced by mixing or melt-kneading polymers obtained by separately polymerizing propylene, α-olefin and/or ethylene.

A desirable polymerization method is a multi-stage polymerization method in which a copolymer portion of propylene with an α-olefin having 4 or more carbon atoms or of propylene with an α-olefin having 4 or more carbon atoms and ethylene that is Component A is produced in a first stage and then a copolymer portion of propylene with an α-olefin having 4 or more carbon atoms or of propylene with an α-olefin having 4 or more carbon atoms and ethylene that is Component B is produced in or after a second stage which is conducted after the first stage.

Examples of a method for producing Component A include solvent polymerization using an inert solvent typified by hydrocarbon such as hexane, heptane, octane, decane, cyclohexane, methylcyclohexane, benzene, toluene and xylene, bulk polymerization using a liquid monomer as a solvent, gas phase polymerization which is carried out in a gaseous monomer. Of these methods, bulk polymerization and gas phase polymerization are preferable because of their easy post-treatment.

The polymerization temperature in the production of Component A is usually from 20 to 150° C., preferably from 35 to 95° C. Polymerization in such temperature ranges is preferred from the viewpoints productivity and also for the purpose of achieving desired contents of Component A and Component B.

A method for producing Component B include a case where Component A is produced and Component B is subsequently produced in the same polymerization reactor and a case where Component B is produced after the production of Component A in a different polymerization reactor. As regards the polymerization method employed in the case of producing Component B after the production of Component A in a different polymerization reactor, solvent polymerization, bulk polymerization, gas phase polymerization, or a polymerization method comprising a combination thereof can be employed. In particular, bulk polymerization, gas phase polymerization or a polymerization method comprising a combination thereof is preferred because a polymerization catalyst has a high activity and it is easy to carry out a post-treatment.

The polymerization temperature in the production of Component B may be either the same as or different from the polymerization temperature of Component A, but it is usually from 20 to 150° C., preferably from 35 to 95° C.

The copolymer of propylene with α-olefin and/or ethylene used in the present invention may also be used for the present invention after optionally performing post-treatment, such as inactivation of the catalyst, removal of the solvent, removal of the monomers, drying and granulation, conducted after the production of the copolymer.

To the copolymer of propylene with α-olefin and/or ethylene used in the present invention, additives or other resins may, according to demand, be added to form a resin composition. Examples of the additives include an antioxidant, an ultraviolet absorber, an antistatic agent, a lubricant, a nucleating agent, an adhesive, an anti-fogging agent, and an anti-blocking agent.

The melt flow rate (MFR) of the copolymer of propylene with α-olefin and/or ethylene used in the present invention or a resin composition containing the copolymer may be changed by a known method during melt-kneading. For example, according to demand, the flowability can be controlled by changing the melt flow rate (MFR) of the aforementioned polymer or resin composition by use of an organic peroxide.

The stretched film of the present invention is a stretched film which comprises a layer comprising the copolymer of propylene with α-olefin and/or ethylene used in the present invention and which has been stretched at least uniaxially.

Examples of the stretched film of the present invention include a single layer stretched film made up only of a layer containing the copolymer of propylene with α-olefin and/or ethylene used in the present invention and a multi-layer stretched film made up of a substrate layer containing a different resin and a layer containing the copolymer of propylene with α-olefin and/or ethylene used in the present invention. Preferred is a multi-layer stretched film. Particularly preferred is a multi-layer stretched film in which a layer comprising the copolymer of propylene with α-olefin and/or ethylene used in the present invention is laminated as at least one outermost layer.

As a resin for the substrate layer in a multi-layer stretched film, for example, a crystalline α-olefin polymer is employed. In particular, crystalline polypropylene is preferably used.

Regarding the crystalline polypropylene, that comprising 80% by weight of more of a portion insoluble in boiling heptane which exhibits an intrinsic viscosity ($[\eta]$) of from 1.3 to 4.2 dl/g and which comprises a propylene component in an amount of 95% by weight or more is preferably employed. Moreover, the crystalline polypropylene may contain 5% by weight or less of ethylene and/or 1-butene component.

The method for production of the stretched film of the present invention is not particularly restricted and known methods can be mentioned. Examples are those mentioned hereafter including (1) a longitudinal uniaxial stretching mode, (2) a transverse uniaxial stretching mode, (3) a successive biaxial stretching mode, (4) simultaneous biaxial stretching mode or (5) a tubular biaxial stretching mode.

(1) Longitudinal Uniaxial Stretching

A raw material resin is molten in an extruder, extruded from a T die, and cooled and solidified into a sheet form using a cooling roll. Then, the resulting sheet is stretched in a longitudinal direction, while being heated with a series of heating roll, to form a film. After optional treatment such as corona treatment, the film is wound up.

(2) Transverse Uniaxial Stretching

A raw material resin is molten in an extruder, extruded from a T die, and cooled and solidified into a sheet form using a cooling roll. Then, both ends of the resulting sheet are held in two lines of chucks arranged along the flow direction and the sheet is stretched laterally by opening up the space between the two lines of the chucks in an oven comprising a pre-heating portion, a stretching portion and a heat-treatment portion. After optional treatment such as corona treatment, the film is wound up.

(3) Successive Biaxial Stretching

A raw material resin is molten in an extruder, extruded from a T die, and cooled and solidified into a sheet form using a cooling roll. Then, the resulting sheet is pre-heated and stretched in a longitudinal direction using a series of heating roll. Then, both ends of the resulting sheet are held in two lines of chucks arranged along the flow direction and the sheet is stretched transversely by opening up the space between the two lines of the chucks in an oven comprising a pre-heating portion, a stretching portion and a heat-treatment portion. After optional treatment such as corona treatment, the film is wound up. The temperature at which the raw material resin is molten in the extruder usually ranges from 230° C. to 290° C., though it may vary depending upon the molecular weight. The longitudinal stretching is usually performed at a temperature ranging from 130 to 150° C. in a stretching ratio of from 4 to 6 times. The transverse stretching is usually performed at a temperature ranging from 150 to 165° C. in a stretching ratio of 8 to 10 times.

(4) Simultaneous Biaxial Stretching

A raw material resin is molten in an extruder, extruded from a T die, and cooled and solidified into a sheet form using a cooling roll. Then, both ends of the resulting sheet are held in two lines of chucks arranged along the flow direction and the sheet is stretched in a longitudinal and transverse directions simultaneously by opening up the space between the two lines of the chucks and also opening each interval between two chucks in each line in an oven comprising a pre-heating portion, a stretching portion and a heat-treatment portion. After performance e.g. of corona treatment carried out as required, the film is wound up.

(5) Tubular Biaxial Stretching

A raw material resin is molten in an extruder, then extruded from an annular die, and cooled and solidified into a tubular form in a water tank. Then, the resulting tube is preheated in an oven or a series of heat rolls and then passed through low-speed nip rolls and wound up with high-speed nip rolls, thereby being stretched in a flow direction. During this operation, the tube is stretched also in the transverse direction by its expansion caused by the inner pressure of the air accumulated between the low-speed nip rolls and the high-speed nip rolls. The stretched film passed through the high-speed nip rolls are heat-treated with an oven or a series of heat rolls. After performance e.g. of corona treatment carried out as required, the film is wound up.

EXAMPLES

The present invention will be described specifically below with reference to examples and compatible examples. However, the invention is not restricted to the examples. The methods for preparing the samples used in the examples and comparative examples and the methods for measuring physical properties are shown below.

(1) Contents of Component A and Component B in Propylene-Based Copolymer (Unit: % By Weight)

The contents were determined from material balance.

(2) 1-Butene Contents in Component A and Component B (Unit: mol %)

The measurement of IR spectrum described in Macromolecule Handbook (1995, published by Kinokuniya), page 619 was carried out, thereby obtained the 1-butene content in Component A and a propylene-based copolymer. The 1-butene content in Component B was calculated from the following equation using the contents of Component A and Component B in the copolymer and the 1-butene contents of the copolymer and Component A. (1-Butene Content in Component B (mol %))={(1-Butene Content in Copolymer (mol %))×100−(1-Butene Content in Component A (mol %))×(Content of Component A (wt %))}/Content of Component B (wt %))

(3) Intrinsic Viscosity [η] (Unit: dl/g)

Measurement was performed by use of an Ubbelohde's viscometer in 135° C. tetralin.

(3-1) Intrinsic Viscosities of Component A and Component B ([η]A, [η]B, Unit: dl/g)

The intrinsic viscosity of Component B, [η]B, was calculated using the following formula from the intrinsic viscosity of Component A, [η]A, measured after the completion of the polymerization of Component A in the first stage, the intrinsic viscosity of the copolymer, [η]AB, measured after the completion of the polymerization in the second stage, the ratio of Component A, PA (% by weight), and the ratio of Component B, PB (% by weight)

$$[\eta]B = ([\eta]AB - [\eta]A \times PA/100) \times 100/PB$$

(4) Melt Flow Rate (MFR, Unit: g/10 min)

Measurement was performed according to JIS K7210 at a temperature of 230° C. and a load of 21.18 N.

(5) Heat Sealing Temperature (Unit: ° C.)

Surfaces of a film were allowed to face in contact together and were heat sealed by pressing for 2 seconds under a load of 2 kg/cm²G using a heat sealer (manufactured by Toyo Seiki Seisaku-Sho, Ltd.) heated at a predetermined temperature. The resulting sample was conditioned overnight at 23° C. at a humidity of 50% and then a sealing temperature at which a peeling resistance of 300 g/25 mm was detected when peeling was carried out at 23° C., a humidity of 50%, at a peeling speed of 200 mm/min and a peeling angle of 180 degrees, the sealing temperature was used as a heat sealing temperature.

(6) Maximum Endothermic Peak Temperature T (Unit: ° C.) and Ratio of Amount of Main Heat Absorbed to Amount of Total Heat Absorbed (Unit: %)

(6-1) Maximum Endothermic Peak Temperature T (Unit: ° C.)

A 0.5 mm thick sheet was prepared by hot press forming a polypropylene composition (namely, preheating the composition at 230° C. for 5 minutes, increasing the pressure up to 50 kgf/cm²G over 3 minutes and holing the pressure for 2 minutes, and then cooling the composition at 30° C. for 5 minutes). From this sheet was cut off a 10 mg specimen. A DSC curve was obtained by heating the specimen at 220° C. for 5 minutes under a nitrogen atmosphere using a differential scanning calorimeter (Model DSC-7 manufactured by Perkin Elmer Inc.), followed by cooling to 150° C. at a temperature decrease speed of 300° C./minute, followed by holding at 150° C. for one minute, followed by cooling to 50° C. at a temperature decrease speed of 5° C./minute, followed by holding at 50° C. for one minute, followed by heating from 50° C. to 180° C. at a temperature increase speed of 5° C./minute. Further, determined was a temperature (° C.) at which a maximum endothermic peak appears in the DSC curve.

(6-2) Ratio of Amount of Main Heat Absorbed to Amount of Total Heat Absorbed (Unit: %)

Calculated was the area (first area) of a region surrounded by the DSC curve and a straight line (baseline) obtained by joining the point at 53° C. on the DSC curve and that at 170° C. On the other hand, calculated was the area (second area) of a region surrounded by the baseline and the DSC curve within the temperature range of from T−10 (° C.) to T+10 (° C.), wherein T denotes a temperature (° C.) at which a maximum endothermic peak appears in the DSC curve. The ratio (%) of the amount of the main heat absorbed to the amount of the total heat absorbed was calculated from the equation below.

Ratio of amount of main heat absorbed to amount of total heat absorbed (%)=(Second Area/First Area)×100

Example 1

[Synthesis of Solid Catalyst]

The atmosphere in a 200-L stainless reactor equipped with a stirrer was replaced with nitrogen and then 80 L of hexane, 6.55 mol of tetrabutoxytitanium, 2.8 mol of diisobutyl phthalate and 98.9 mol of tetrabutoxysilane were charged therein to form a homogeneous solution. Then, 51 L of a solution of butylmagnesium chloride of a concentration of 2.1 mol/L in diisobutyl ether was added dropwise slowly over 5 hours while the temperature in the reactor was kept at 5° C. After completion of the dropping, stirring was continued for another 1 hour at room temperature. Solid-liquid separation was conducted at room temperature and washing with 70 L of toluene was repeatedly carried out three times. Subsequently, toluene was removed so that the slurry content became 0.6 Kg/L. Thereafter, a mixed solution of 8.9 mol of n-butyl ether and 274 mol of titanium tetrachloride was added and then 20.8 mol of phthalyl chloride was added, followed by a three-hour reaction at 110° C. After the reaction, washing with toluene was carried out twice at 95° C. After adjustment of the slurry concentration to 0.6 Kg/L, 3.13 mol of diisobutyl phthalate, 8.9 mol of n-dibutyl ether and 137 mol of titanium tetrachloride were added and a reaction was carried out at 105° C. for 1 hour. After the completion of the reaction, solid-liquid separation was carried out at that temperature and washing with 90-L toluene was carried out twice at 95° C. After adjustment of the slurry concentration to 0.6 Kg/L, 8.9 mol of n-dibutyl ether and 137 mol of titanium tetrachloride were added and a reaction was carried out at 95° C. for 1 hour. After the completion of the reaction, solid-liquid separation was carried out at that temperature and washing with 90-L toluene was carried out three times at the same temperature. After adjustment of the slurry concentration to 0.6 Kg/L, 8.9 mol of n-dibutyl ether and 137 mol of titanium tetrachloride were added and a reaction was carried out at 95° C. for 1 hour. After the completion of the reaction, solid-liquid separation was carried out at that temperature and washing was carried out three times at the same temperature using 90-L toluene, followed by washing with 90-L of hexane three times, followed by drying under reduced pressure, affording 11 Kg of solid catalyst component. The solid catalyst component contained 1.89% by weight of titanium atom, 20% by weight of magnesium atom, 8.6% by weight of phthalic acid ester, 0.05% by weight of ethoxy group and 0.21% by weight of butoxy group, and had favorable particle properties free from fine powder.

[Pre-activation of Solid Catalyst]

To a SUS autoclave with a capacity of 3 L equipped with a stirrer, 1.5 L of n-hexane which had been fully dewatered and degassed, 37.5 mmol of triethylaluminum, 3.75 mmol of tert-butyl-n-propyldimethoxysilane and 15 g of the aforementioned solid catalyst component were added. Subsequent to pre-activation by continuously feeding 15 g of propylene over 30 minutes while keeping the temperature in the reactor at 5–15° C., the resulting solid catalyst slurry was transferred to a SUS autoclave with a capacity of 200 L equipped with a stirrer, diluted by addition of 140 L of liquid butane, and preserved at a temperature of 5° C. or lower.

[Polymerization]

(First Stage)

In a SUS polymerization tank with a capacity of 300 L equipped with a stirrer, 35 Kg/hr of liquid propylene, 13 Kg/hr of 1-butene and hydrogen in an amount such that the concentration of the gas phase portion is kept at 0.5 vol % were fed. Further, 0.6 g/hr of the pre-activated solid catalyst component was fed and slurry polymerization using liquid propylene as a medium was continued under conditions such that the polymerization temperature was held at 60° C. and the substantial amount of slurry staying in the tank was kept at 90 L. The amount of a polymer formed during this operation was 2.0 Kg/hr. From the analysis of part of the polymer, the butene content was found to be 7.7 mol %. The resulting slurry containing the polymer was transferred continuously to a polymerization tank for a second stage without being inactivated.

(Second Stage)

In a gas-phase Fluidized bed reactor with a capacity of 1 m³ equipped with a stirrer, 22.2 Kg/hr of a polymer was obtained by feeding the solid catalyst component-containing polymer transferred from the reactor for the first stage, 50 mmol/hr of triethylaluminum and 5 mmol/hr of tert-butyl-n-propyldimethoxysilane and continuing the continuous polymerization under a condition such that propylene, hydrogen and 1-butene were fed so as to hold the amount of polymer contained in the fluidized bed to 80 Kg, the polymerization temperature to 65° C., the polymerization pressure to 1.15 MPa, the hydrogen concentration in the gas phase to 2.5 vol % and the 1-butene content in the gas phase to 25 vol %. The butene content in the polymer was 20 mol %. The weight ratio of the polymer in the first stage (Component A) to the polymer in the second stage (Component B) was determined from the amounts of the polymers in individual stages to be 10/90. The 1-butene content in Component B was 22 mol %.

To 100 parts by weight of the powder of the copolymer, 0.1 part by weight of calcium stearate, 0.05 part by weight of Irganox 1010 manufactured by Ciba Specialty Chemicals Co. Ltd. and 0.1 part by weight of 6-di-tert-butyl-4-methylphenol (BHT) manufactured by Sumitomo Chemical Co., Ltd. were mixed and melt-kneaded, thereby forming pellets. The resulting pellets had an MFR of 8.0 g/10 min.

(Preparation of Stretched Film)

Pellets obtained above and FS2011DG2 (a polypropylene having a melting point of 159° C. and an MFR of 2.5 g/10 min) were used for a surface layer and a substrate layer, respectively. These were melt-kneaded separately in different extruders at resin temperatures of 230° C. and 260° C., respectively, and then were fed to one co-extruding T-die. A resin extruded in two-kind three-layer constitution of surface layer/substrate layer/surface layer from the T-die was cooled rapidly with a 30° C. cooling roll, thereby affording a cast sheet 1 mm thick.

The cast sheet obtained in the above manner was preheated and then stretched 5 times in the longitudinal direction at a stretching temperature of 145° C. using the difference in peripheral speed between rolls of the longitudinal stretching machine. Subsequently, the sheet was stretched 8 times in the transverse direction at a stretching temperature of 162° C. in an oven, followed by heat treatment at 170° C. Some films were subjected to corona treatment so that a wet tensile of 42 dyne/cm was obtained. Thereby obtained was a multilayer biaxially stretched film having layers 1 μm/20 μm/1 μm thick, which was then wound up with a winder.

The results of evaluation of physical properties of the resulting film are shown in Table 1.

Comparative Example 1

A propylene-1-butene copolymer was obtained by a single-stage gas phase polymerization using a titanium chloride type solid catalyst system in the same manner as Example 1 described in JP,2-57770,B. The butene content in the resulting copolymer was 19 mol %.

The copolymer (MFR=8.2 g/10 min) was pelletized in the same manner as Example 1 and then was subjected to film formation and physical property evaluation. The results of evaluation are shown in Table 1.

Since a copolymer such that the ratio of the amount of the main heat absorbed to the amount of the total heat absorbed is large was used, the heat sealing temperature was high.

Comparative Example 2

A propylene-1-butene copolymer was obtained by a single-stage gas phase polymerization using a Ti—Mg composite type solid catalyst system in the same manner as Example 1 described in the specification of Japanese Patent No. 3070419. The butene content in the resulting copolymer was 19 mol %.

The copolymer (MFR=8.7 g/10 min) was pelletized in the same manner as Example 1 and then was subjected to film formation and physical property evaluation. The results of evaluation are shown in Table 1.

Since a copolymer such that the ratio of the amount of the main heat absorbed to the amount of the total heat absorbed is large was used, the heat sealing temperature was high.

TABLE 1

|  | Butene-1 Content (mol %) | T (° C.) | Ratio of Heat Absorbed* (%) | Heat Sealing Temperature (° C.) Before Corona | After Corona |
|---|---|---|---|---|---|
| Example 1 | 20 | 128 | 29 | 95 | 104 |
| Comparative Example 1 | 19 | 132 | 37 | 99 | 113 |
| Comparative Example 2 | 19 | 126 | 38 | 100 | 105 |

Ratio of Heat Absorbed* = (Amount of Main Heat Absorbed)/(Amount of Total Heat Absorbed)

Example 2

Pelletization was carried out in the same manner as Example 1 using a powder of the copolymer obtained in Example 1 (MFR=3.4) and a biaxially stretched film was obtained by a method described below. The heat shrinkage of the resulting film was determined and is shown in Table 2.

Comparative Example 3

Pelletization was carried out in the same manner as Example 1 using a powder of the copolymer obtained in Comparative Example 1 (MFR=3.7) and a biaxially stretched film was obtained by a method described below. The heat shrinkage of the resulting film was determined and is shown in Table 2.

Since a copolymer such that the ratio of the amount of the main heat absorbed to the amount of the total heat absorbed is large was used, the heat shrinkage was small.

Comparative Example 4

A propylene-1-butene-ethylene copolymer was obtained by a single-stage gas phase polymerization using a Ti—Mg composite type solid catalyst in the same manner as Example 1 described in Japanese Patent No. 3070419. The resulting copolymer has a 1-butene content of 5.4 mol %, and an ethylene content of 3.8 mol %.

The copolymer (MFR=3.0 g/10 min) was pelletized in the same manner as Example 1 and a biaxially stretched film was obtained by a method described below. The heat shrinkage of the resulting film was determined and is shown in Table 2.

Since a copolymer such that the amount of the main heat absorbed relative to the amount of the total heat absorbed is large was used, the heat shrinkage was small.

Tabletop Biaxial Stretching

A resin composition was heat press formed. Specifically, a 110 mm by 110 mm press sheet was prepared by preheating the resin composition at 230° C. for 5 minutes, increasing the pressure up to 50 kgf/cm$^2$ G over 3 minutes and holing the pressure for 2 minutes, and then cooling the composition at 30° C. for 5 minutes. The resulting press sheet was punched into a size of 90 mm by 90 mm and was subjected to stretching under the following conditions, thereby obtaining a biaxially stretched film.

Stretching Conditions

Stretching machine: Tabletop biaxially stretching machine manufactured by Toyo Seiki Seisaku-Sho, Ltd.

Preheating temperature: 110° C.

Stretching temperature: 110° C.

Stretching ratio: 4 times by 4 times

Preheating time: 3 min

Stretching speed: 1.8 m/min

Heat setting temperature: 110° C.

Heat setting time: 30 sec

Heat set relaxation: Not done

Heat Shrinkage (Unit: %)

A 90 mm by 90 mm specimen was sampled from the film resulting from the tabletop biaxial stretching and marked lines were placed thereon along MD and TD wherein a direction parallel to a certain side is defined as MD and the direction perpendicular to MD is defined as TD. After immersion in a 110° C. silicone oil for 5 seconds, the specimen was taken off and then cooled at room temperature for 30 minutes, followed by measurement of the lengths of the marked lines on the specimen. Shrinkages in the individual directions were calculated using the following equation and the average value of the shrinkages of both directions was used as the heat shrinkage of the aforementioned film.

Shrinkage=100×{(90−Length (mm) of marked line after heating)/90}

TABLE 2

|  | MFR (g/10 min) | Butene-1 Content (mol %) | Ethylene Content (mol %) | T (° C.) | Ratio of Heat Absorbed* (%) | Heat Shrinkage (%) |
|---|---|---|---|---|---|---|
| Example 2 | 3.4 | 20.0 | — | 128 | 29 | 39.7 |
| Comparative Example 3 | 3.7 | 19.2 | — | 132 | 37 | 33.7 |
| Comparative Example 4 | 3.0 | 5.4 | 3.8 | 132 | 57 | 29.8 |

Ratio of Heat Absorbed* = (Amount of Main Heat Absorbed)/(Amount of Total Heat Absorbed)

As described in detail above, in accordance with the present invention, a stretched film excellent in low-temperature heat sealability after corona treatment as well as that before corona treatment and/or in heat shrinkability can be obtained.

What is claimed is:

1. A film stretched at least uniaxially, the film comprising a layer comprising a copolymer of propylene with α-olefin and/or ethylene such that in measurement of a DSC curve of the copolymer of propylene with α-olefin and/or ethylene the amount of the heat absorbed in the temperature range of from T−10 (° C.) to T+10 (° C.) accounts for from 15 to 36% of the amount of the heat absorbed in the temperature range of from 53 to 170° C., wherein T denotes a temperature (° C.) at which a maximum endothermic peak appears in the DSC curve, wherein the ethylene content of the copolymer is not more than 5 mol %.

2. The stretched film according to claim 1, wherein the copolymer of propylene with α-olefin and/or ethylene contains from 1 to 30% by weight of Component A defined below and from 70 to 99% by weight of Component B defined below, provided that the total amount of the copolymer of propylene with α-olefin and/or ethylene is let be 100% by weight, Component A: A copolymer portion of propylene with α-olefin having 4 or more carbon atoms, or of propylene with α-olefin having 4 or more carbon atoms and ethylene satisfying (Requirement 1) and (Requirement 2) shown below:
(Requirement 1) the content of α-olefin having 4 or more carbon atom in Component A is not less than 1 mol % and less than 15 mol %, and
(Requirement 2) the content of ethylene in Component A is not more than 5 mol %;

Component B: a copolymer portion of propylene with α-olefin having 4 or more carbon atoms or of propylene with α-olefin having 4 or more carbon atoms and ethylene satisfying (Requirement 3) and (Requirement 4) shown below:
(Requirement 3) the content of α-olefin having 4 or more carbon atoms in Component B is from 15 to 30 mol %, and
(Requirement 4) the content of ethylene in Component B is not more than 5 mol %.

3. The stretched film of claim 2, wherein the copolymer of propylene with α-olefin and/or ethylene is a copolymer such that Component A is obtained in a first step and Component B is obtained in or after a second step conducted after the first step.

4. The stretched film of claim 1, wherein the copolymer of propylene with α-olefin and/or ethylene is a copolymer obtained by polymerizing propylene with α-olefin and/or ethylene using a catalyst system containing Ti, Mg and halogen as essential components.

* * * * *